(12) United States Patent
Schmidt

(10) Patent No.: US 7,991,899 B2
(45) Date of Patent: Aug. 2, 2011

(54) SYSTEMS AND METHODS FOR ESTABLISHING RULES FOR COMMUNICATION WITH A HOST

(75) Inventor: Wayne K. Schmidt, Tokyo (JP)

(73) Assignee: Morgan Stanley, New York, NY (US)

( * ) Notice: Subject to any disclaimer, the term of this patent is extended or adjusted under 35 U.S.C. 154(b) by 994 days.

(21) Appl. No.: 11/900,358

(22) Filed: Sep. 11, 2007

(65) Prior Publication Data

US 2008/0077695 A1     Mar. 27, 2008

Related U.S. Application Data

(60) Provisional application No. 60/825,300, filed on Sep. 12, 2006.

(51) Int. Cl.
*G06F 15/16*     (2006.01)

(52) U.S. Cl. ......... 709/228; 709/227; 709/224; 709/225

(58) Field of Classification Search ................. 709/223, 709/224, 227–228; 707/3
See application file for complete search history.

(56) References Cited

U.S. PATENT DOCUMENTS

| | | | |
|---|---|---|---|
| 6,219,786 B1 * | 4/2001 | Cunningham et al. | 713/152 |
| 6,775,694 B1 | 8/2004 | Fougerat | |
| 7,383,252 B2 * | 6/2008 | Soogoor | 1/1 |
| 2005/0234920 A1 | 10/2005 | Rhodes | |
| 2005/0240621 A1 * | 10/2005 | Robertson et al. | 707/102 |
| 2006/0015436 A1 | 1/2006 | Burns et al. | |
| 2006/0026669 A1 | 2/2006 | Zakas | |
| 2007/0180490 A1 * | 8/2007 | Renzi et al. | 726/1 |

OTHER PUBLICATIONS

"Solsoft Policy Server, Better Management for Network Security," Solsoft, Inc., Apr. 2005.
International Search Report for PCT/US07/19737, Sep. 18, 2008 (4 pages).

* cited by examiner

*Primary Examiner* — Ario Etienne
*Assistant Examiner* — Sahera Halim
(74) *Attorney, Agent, or Firm* — K&L Gates LLP

(57) ABSTRACT

Systems and methods for establishing rules for communication with a host. Network activity data for communications between Host A and Host B may be collected and analyzed by a rules engine to create rules governing communications between the Host A and Host B. The rules may then be loaded in a first, centralized, database, where an activity analyzer engine may analyze trends in rule growth to determine if a gateway for Host A, which will control communications to and from Host A, is ready for deployment. Once it is determined that the gateway is ready for deployment, the rules may be replicated from the first, centralized database to a second, regional database associated with Host A. The gateway may then be enabled based on the rule data stored in the second, regional database so that the gateway can determine if communications between the Host A and Host B violate the rules. Post-deployment of the gateway, the rules may be continually updated based on changes to the network, etc., or based on input from network administrators. Embodiments of the present invention could be used, for example, to prevent test trade orders, used at a trading firm to test how order flow will be handled by new software, from reaching a trading exchange.

13 Claims, 10 Drawing Sheets

SYSTEMS AND METHODS FOR ESTABLISHING RULES FOR COMMUNICATION WITH A HOST

PRIORITY CLAIM

The present application claims priority to U.S. provisional application Ser. No. 60/825,300, filed Sep. 12, 2006, entitled "SYSTEMS AND METHODS FOR ESTABLISHING RULES FOR COMMUNICATION WITH A HOST," by Wayne Schmidt, which is incorporated herein by reference.

BACKGROUND

Firms that trade securities and the like often need to test how order flow is handled by new software. In order to perform such testing, test trade orders are sometimes sent. However, because the trading system cannot distinguish a real trade order from a test trade order, the test trade orders are sometimes sent to an exchange.

SUMMARY

In one general aspect, the present invention is directed to systems and methods for establishing rules for communication with a host (say, Host A). According to various embodiments, network activity data for communications between the Host A and another host (say, Host B) may be collected and analyzed by a rules engine to create rules governing communications between the Host A and Host B. The rules may then be loaded in a first, centralized, database, where an activity analyzer engine may analyze trends in rule growth to determine if a gateway for Host A, which will control communications to and from Host A, is ready for deployment. Once it is determine that the gateway is ready for deployment, the rules may be replicated from the first, centralized database to a second, regional database associated with Host A (and the gateway). The gateway may then be enabled based on the rule data stored in the second, regional database so that the gateway can determine if communications between the Host A and Host B violate the rules. Post-deployment of the gateway, the rules may be continually updated based on changes to the network, etc., or based on input from network administrators, for example.

Embodiments of the present invention could be used, for example, to prevent test trade orders, used at a trading firm to test how order flow will be handled by new software, from reaching a trading exchange. The gateway in such a case may be loaded with rules to recognize that trade orders from certain hosts (such as hosts associated with business units that do not submit real trade orders) are not real trade orders and should be prevented from reaching the trading exchange. Embodiments of the present invention could also be used for other types of network activity, including network activity between two hosts associated with or within the same firm or entity.

FIGURES

Various embodiments of the present invention are described herein by way of example in conjunction with the following figures, wherein:

FIGS. 3 through 10 are show screenshots of a graphical user interface (GUI) according to various embodiments of the present invention.

DESCRIPTION

Figure 1:
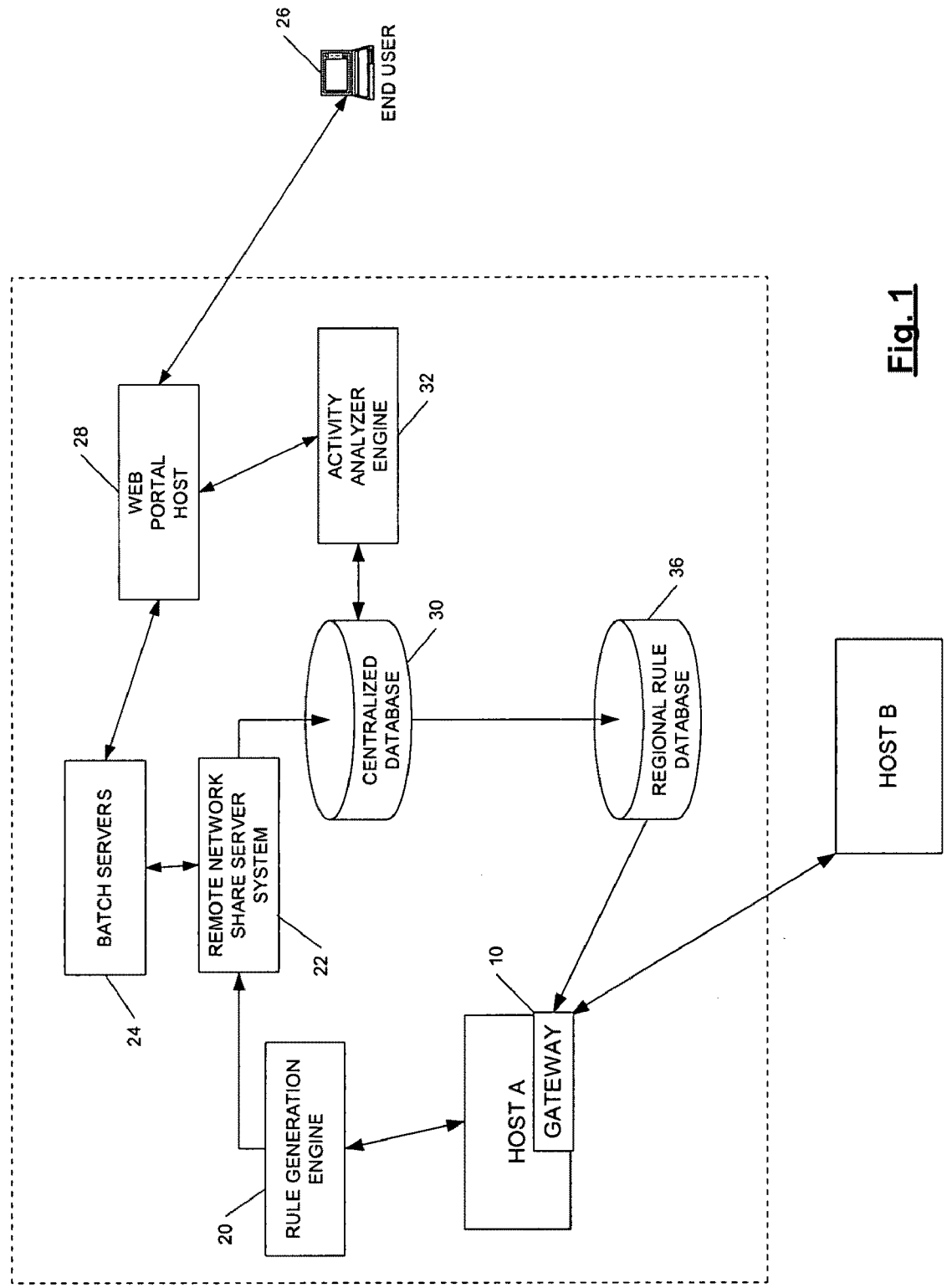
FIG. 1 is a simplified block diagram of the system for establishing and managing rules for communication with a host according to various embodiments of the present invention.

In one general aspect, the present invention is directed to systems and methods for establishing and managing rules for communication with a host computer system ("host"). FIG. 1 is a diagram of the system according to various embodiments of the present invention. A gateway 10 or other type of similarly configured computer system/device may act as a firewall for Host A. The gateway 10 may prevent certain communications sent from Host A from reaching Host B based on rules applied by the gateway 10. The gateway 10 may also prevent certain communications sent from Host B from reaching Host A.

According to various embodiments, the gateway 10 may be used to prevent test trade orders from being sent from a trading firm (e.g., associated with Host A) to an exchange (associated with Host B). In such an embodiment, a trade order may be send from Host A to Host B. The trade orders (either test or real) may be trade orders relating to the trade of securities, options, derivatives, futures and/or commodities, for example. The exchange may be a trading exchange that acts as a marketplace for such items. The gateway 10 may apply rules to determine if the trade order is a test trade order or a real trade order. If it determines that it is a test trade order, the gateway may deny the communication to Host B. That way, the firm can, for example, test how order flow for trade orders will be handled by new software without having those test trade orders being communicated to the exchange. The invention could also be used for other types of communications to or from a host.

Figure 2:
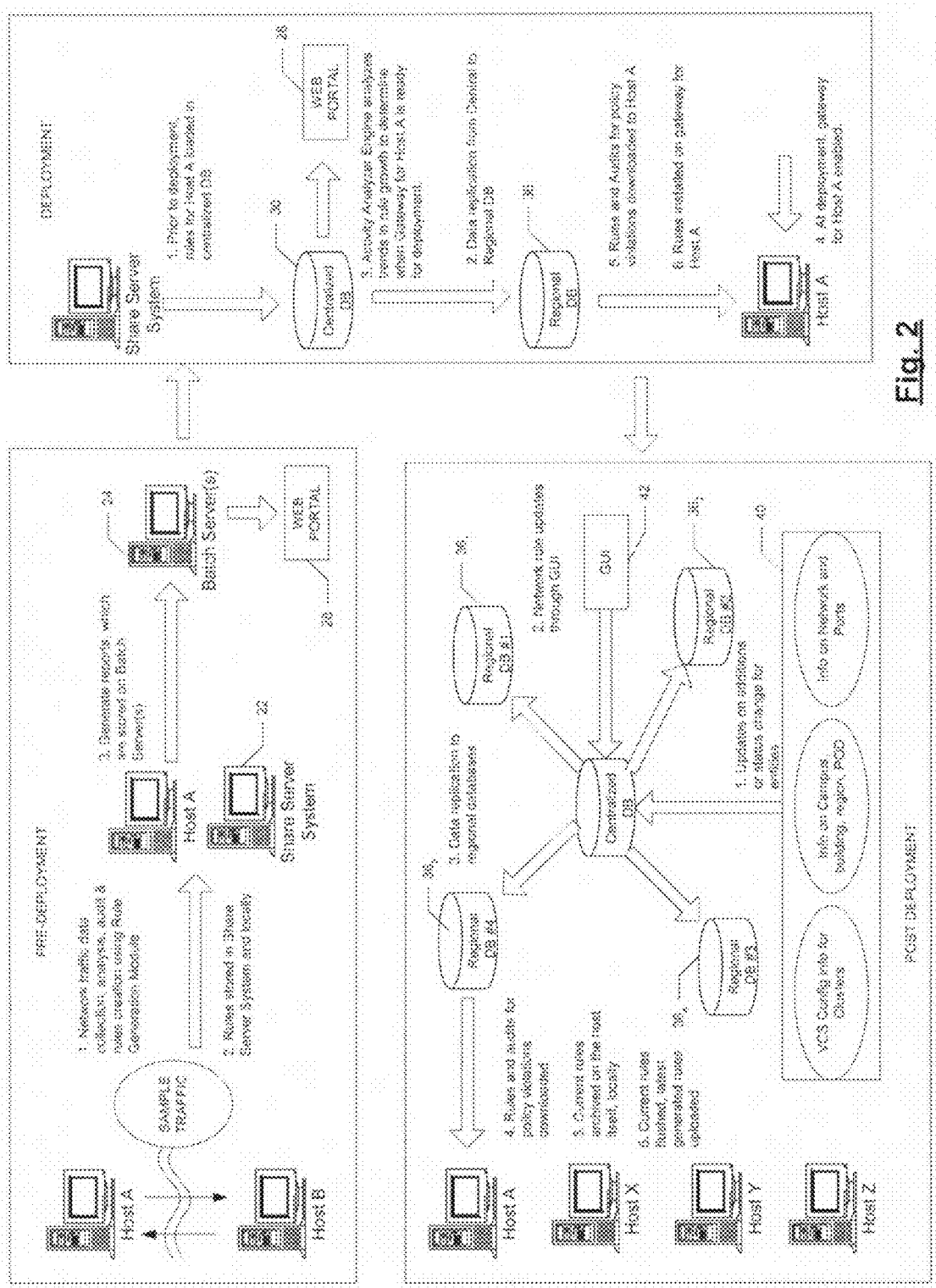
FIG. 2 is a diagram illustrating aspects of a process for configuring the gateway of the system of FIG. 1 according to various embodiments of the present invention.

FIG. 2 is a diagram of a process for configuring the gateway 10. Prior to deployment of the gateway 10, a rule generation engine 20 may collect network activity data for communications between Host A and Host B, analyze and audit the network activity data, and create rules for governing communications between Host A and Host B. The rules may be stored, for example, in a local disk cache or other local memory type associated with Host A, as well as in a network database, such as a remote network share server system 22. Reports regarding the rules may be generated and stored on batch servers 24, which end users 26 can access via a web portal 28, for example.

Closer to deployment (such as, for example, one week prior to deployment) and after the network activity between Host A and Host B has been gathered for a sufficient period time, the rules for Host A (from either the remote network share server system 22 or the local disk cache, for example) may be loaded to a read-writable centralized database 30. An activity analyzer engine 32 may analyze the trend in rule growth to determine when the gateway 10 for Host A is ready for deployment. Because a new rule may be created for each new type of communication, if, for example, new rules are being created at a greatly diminished rate as the sampling progresses because there are fewer types of new communications, it may be determined that the gateway 10 is ready for deployment. Reports can be viewed by end users 26 (e.g., administrators) via the web portal, for example.

The rule data may be replicated from the centralized database 30 to the regional rule database 36 associated with Host A (as well as other regional rule databases). The replication can occur almost instantaneously after the data is loaded to the centralized database 30. The regional rule database 36 may be a read-only database, for example.

On the date of deployment (such as midnight on the date of deployment), the gateway 10 for Host A can be enabled. The gateway 10 may download the rules and audits for policy violations from the regional database 30, and the rules may then be installed on the gateway 10 for Host A. If a communication from or to Host A violates the rules installed on the gateway 10, the gateway 10 may deny the communication.

On an ongoing basis after deployment (such as overnight), as shown in FIG. 2, the centralized database 30 may receive updates on additions or status changes for entities. This function may be performed by a data synchronization program or engine 40 that synchronizes entity information with other sources. The addition or status changes for entities may include information on clusters, location (e.g., campus, region, building, etc.), network and ports.

Also on an ongoing basis post-deployment, network rules may be updated by an administrator (or other end user) through the graphical user interface 42 provided by the web portal host 28. Also, the network rules may be updated using an application that provides a command line interface for adding/changing/querying rules. The updated rules may be stored in the centralized database 30, as shown in FIG. 2. According to various embodiments, all or some of the rule activity over a given period can be compared to the rules, with the inactive rules being deleted.

The data from the centralized database 30 may be replicated to each of the regional databases 36$_{1-4}$. This way also be done overnight and may also be done almost instantaneously. Each night, for example, rules and audits for policy violations may be downloaded to the hosts associated with each of the regional databases 36. Also, the current rules on the hosts may be archived locally. In addition, the current rules may be flushed from the hosts and the latest rules may be uploaded to the hosts.

Different types of rules may be used. A default rule may deny any communication traffic to or from a particular host that does match another rule which permits the traffic. Basic rules may be installed on each host, for example, to allow infrastructure services to function properly (e.g., VMS, VCS, Kerberos, AFS, etc.). Client rules may be rules created by customers (e.g., end users or administrators) for connectivity between hosts on certain ports. Such rules may be determined and maintained by the customer. Other types of rules may also be used.

According to various embodiments, data on permitted and denied communications between two hosts may be summarized in reports at a portal (such as GUI 42) for auditing.

Figure 3:
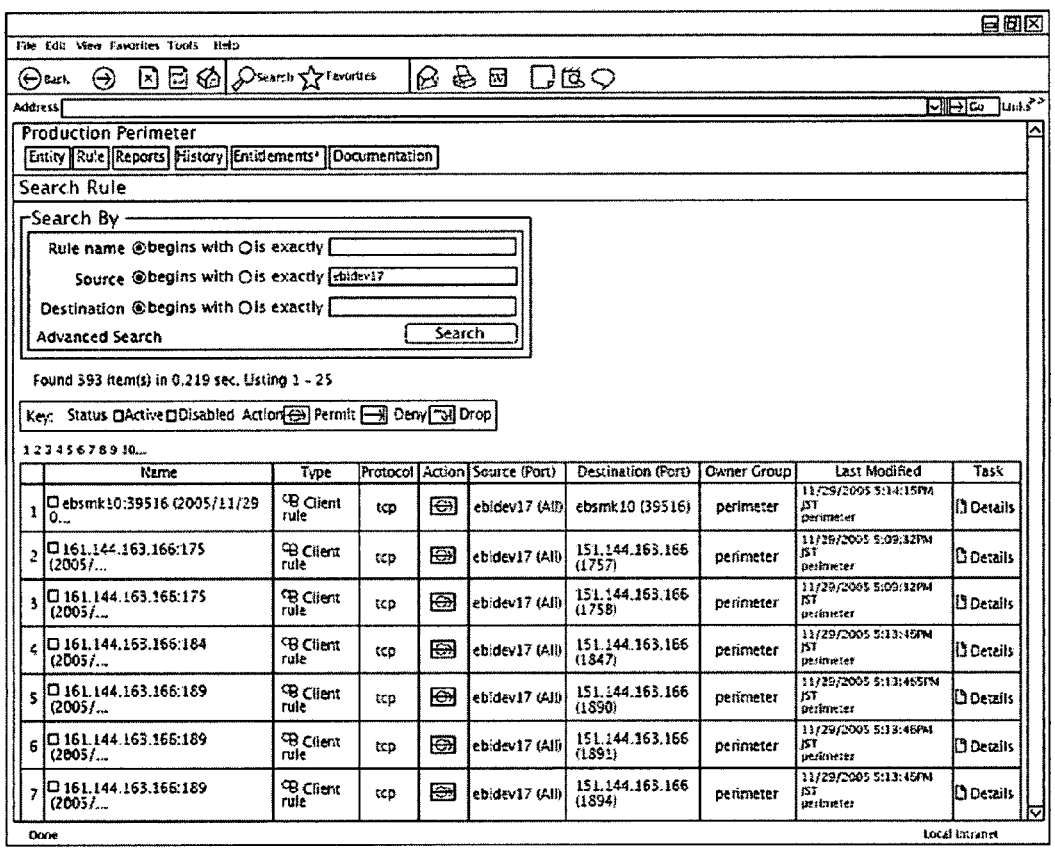

FIGS. 3 through 10 show examples of screen shots that an end user 26 may access through the graphical user interface (GUI) 42 provided by the web portal host 28. FIG. 3 is an example of screen shot by which an end user could search rules via the GUI. As shown in FIG. 3, rules may be searched by rule name, source, or destination, for example. The rules that meet the search criteria are also shown in FIG. 3. As can be seen, symbols may be used to designate the type of action required by the rule. One symbol may be used to indicate permitted communications, another symbol for denied communications, and a third symbol for dropped communications, for example.

Figure 4:
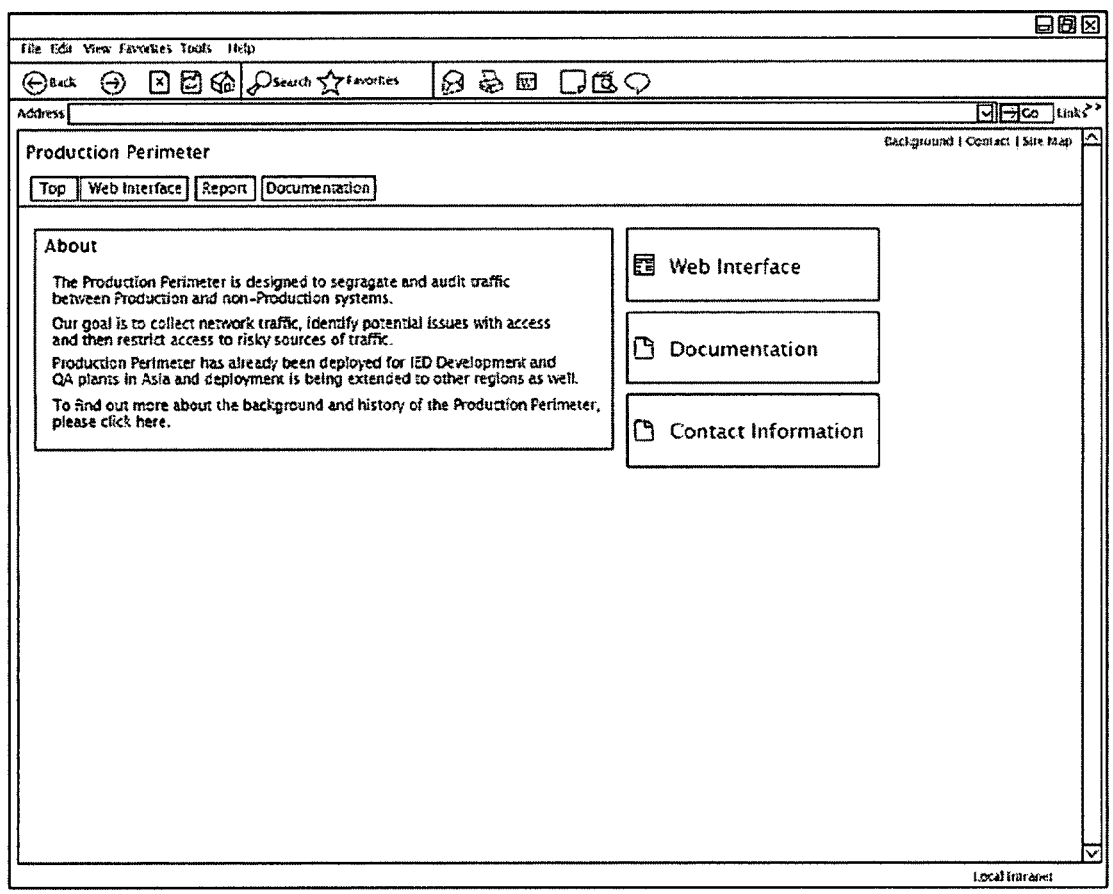
Figure 5:
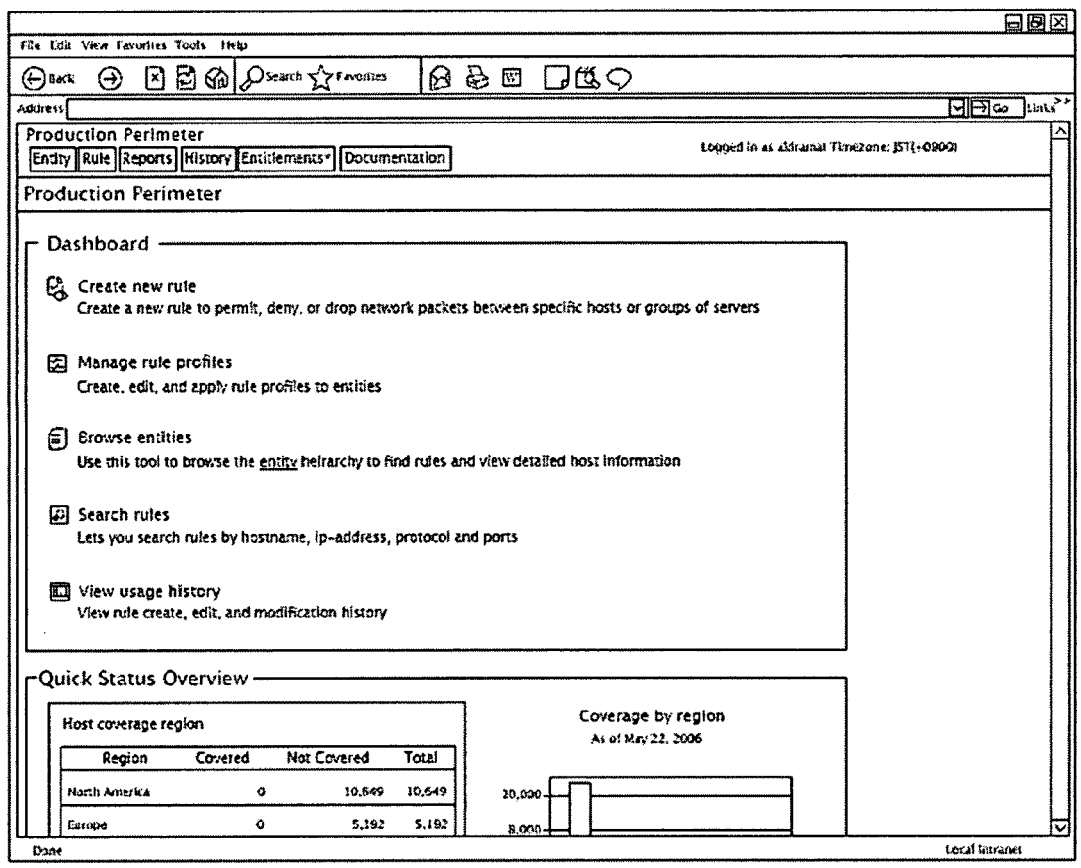
Figure 6:
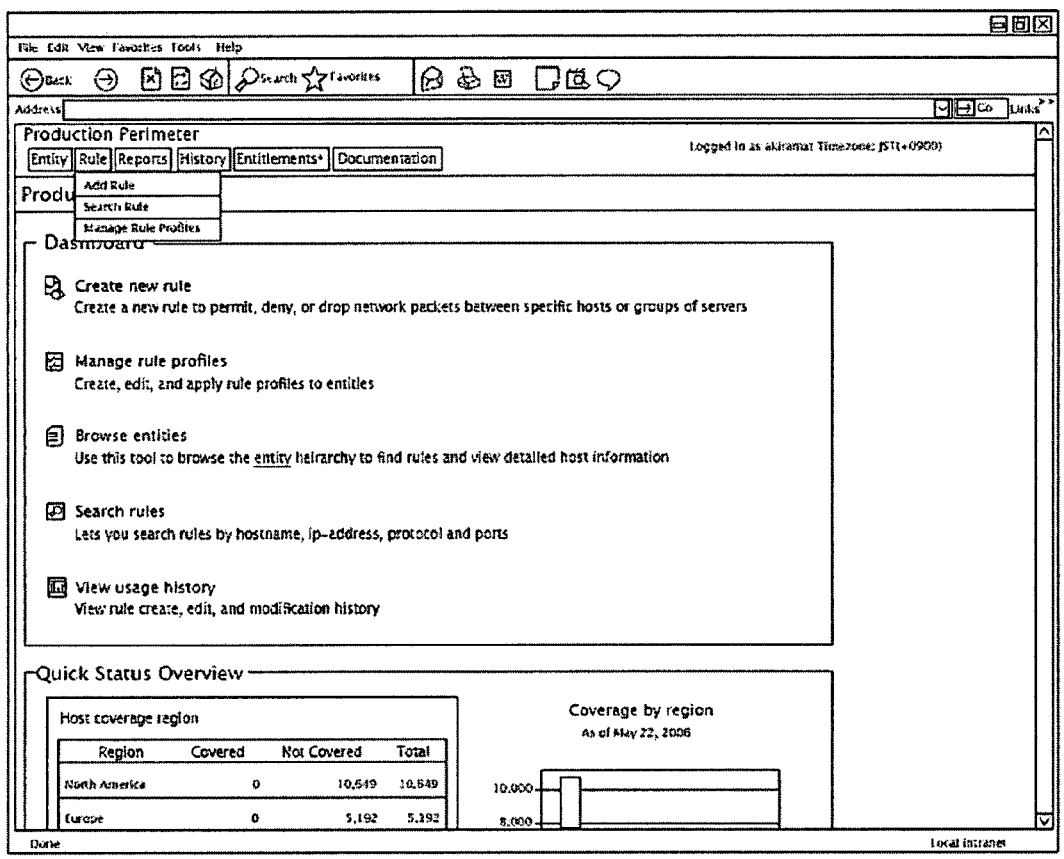

FIG. 4 is an example of a screen shot that an end user may access through the GUI to create a rule. Clicking on the "Web Interface" tab in the GUI of FIG. 4 may produce the screen shot shown in FIG. 5, which provides the end user with options relative to the system, including, as shown in FIG. 5, creating a new rule, managing rule profiles, browsing entities, searching rules, and viewing usage history, for example. A user could also choose various options by clicking the tabs in the upper part of the GUI. FIG. 6 shows an example where the "Rule" tab has been clicked, allowing the end user to choose to add a rule, search rules, or manage rule profiles, for example.

Figure 7:
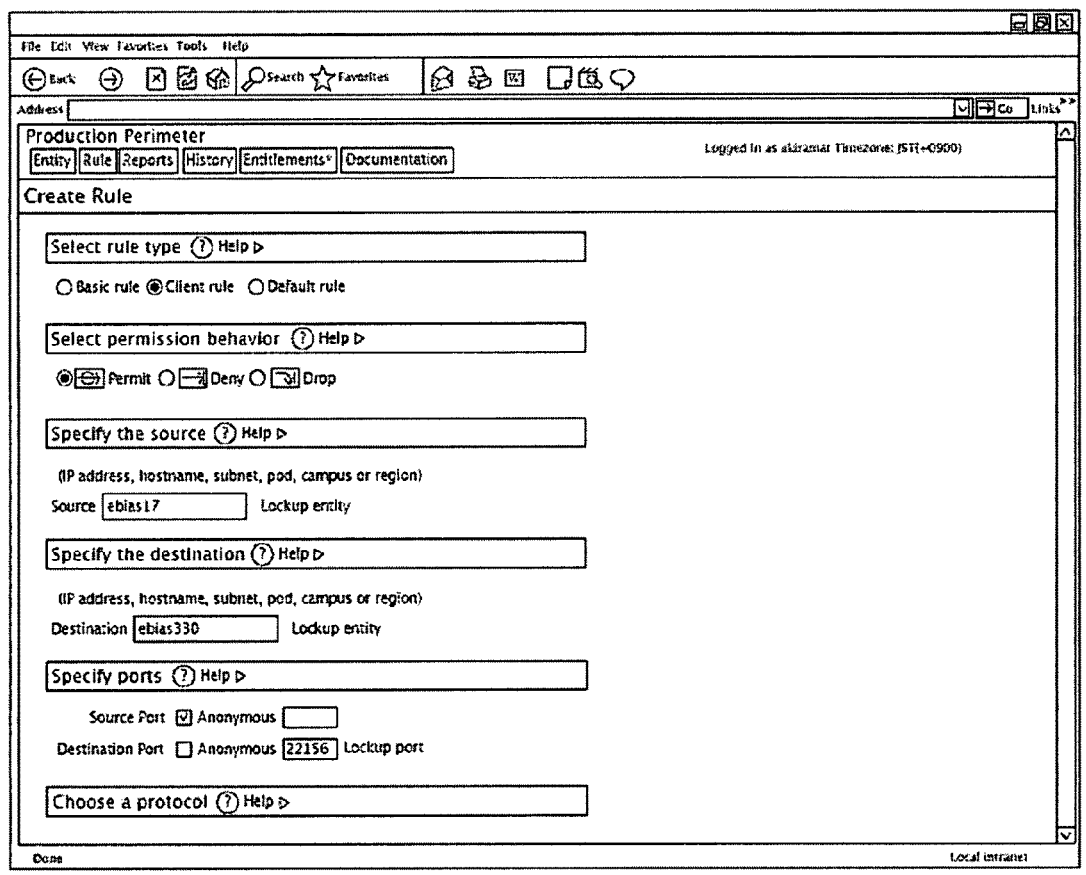
Figure 8:
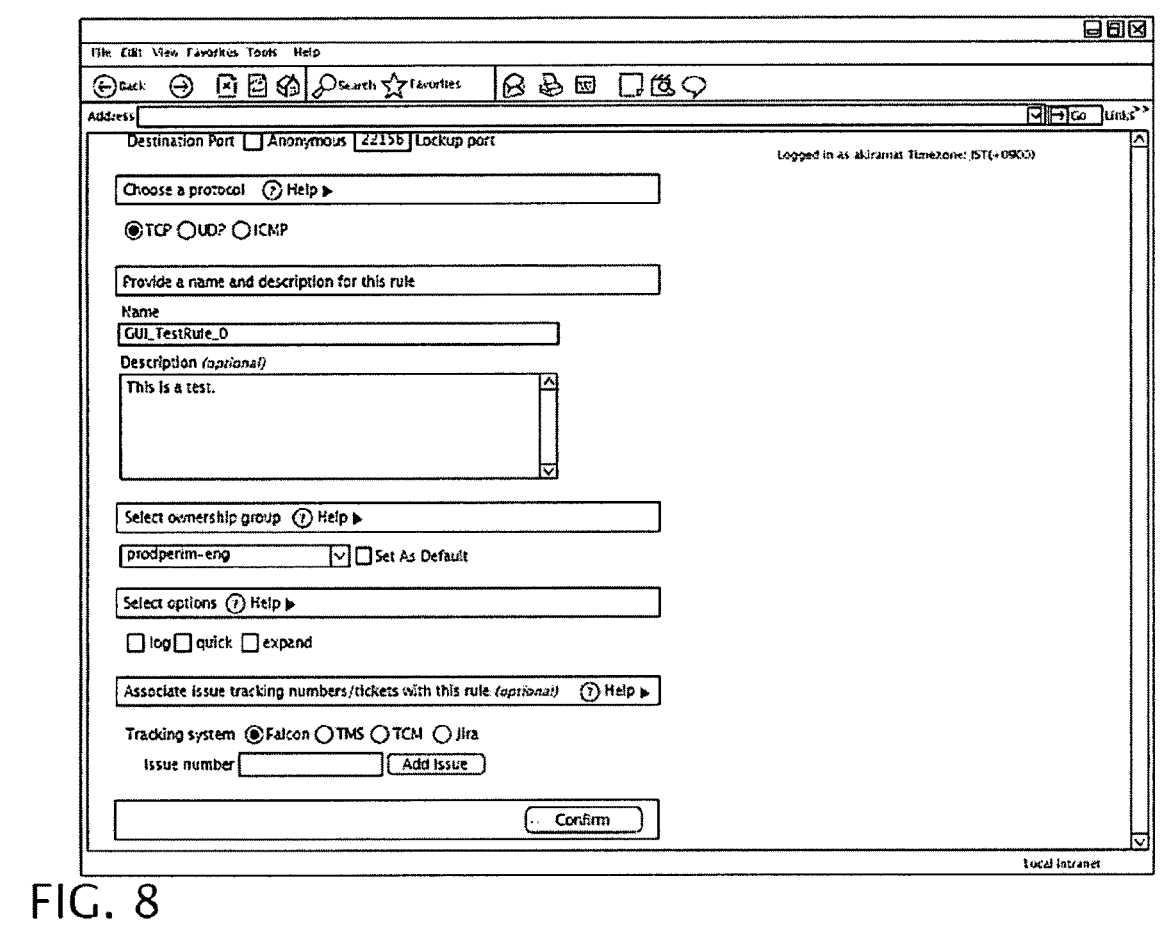
Figure 9:
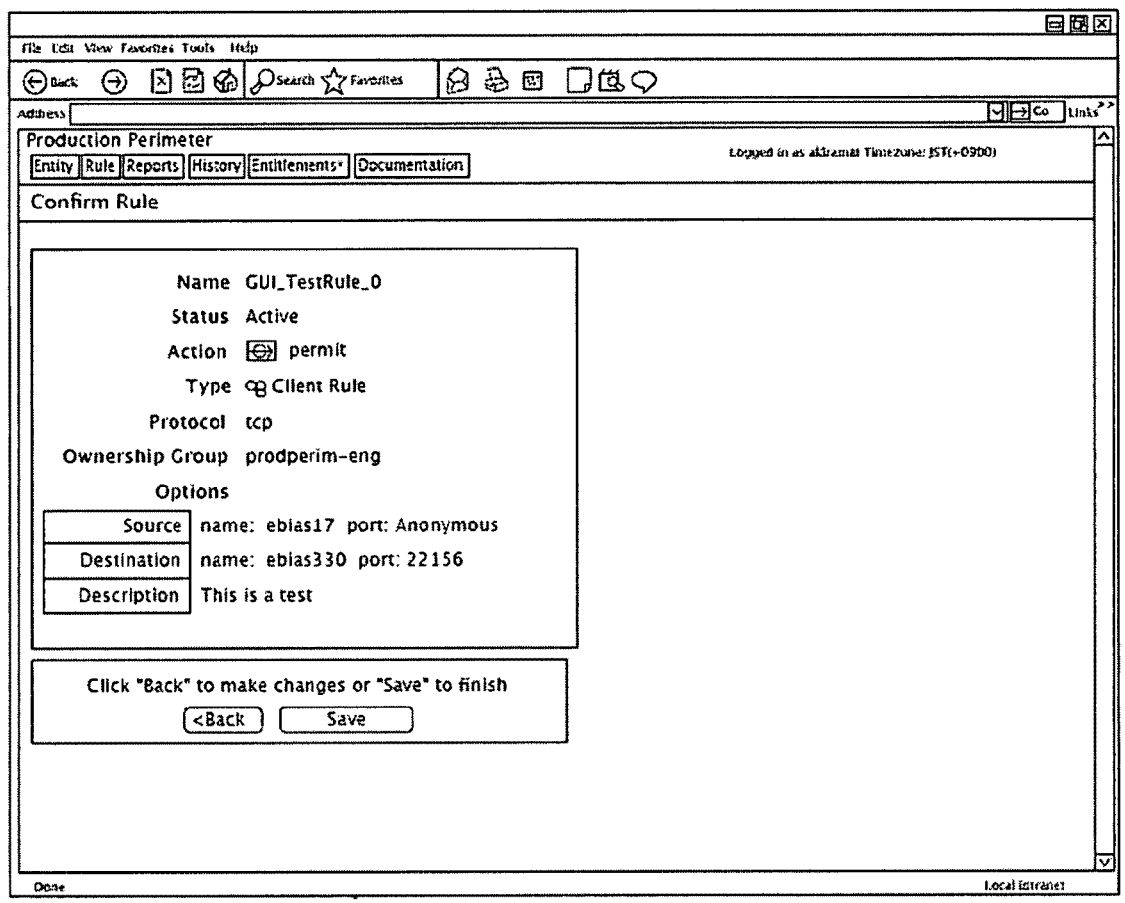
Figure 10:
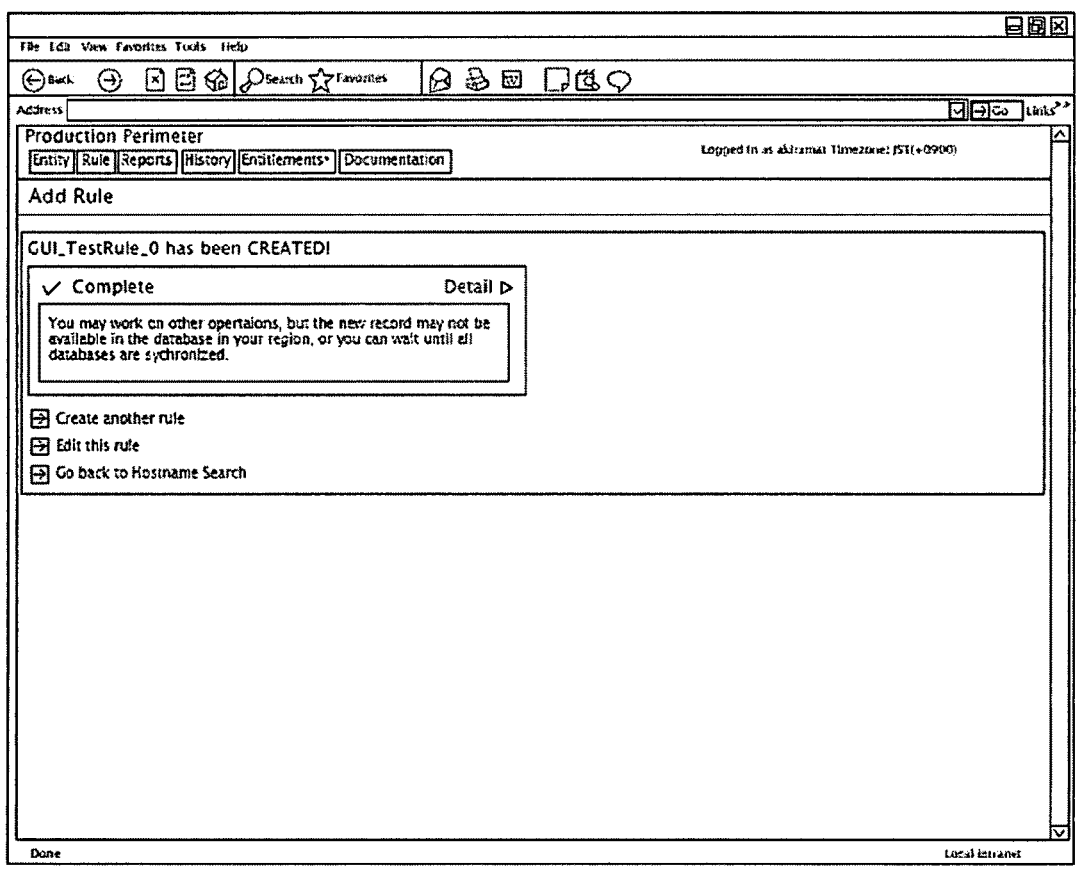

FIGS. 7 and 8 show an example where the option to create a new rule has been chosen. As shown in this example, the user may select the rule type (e.g., basic, client or default), the permission behavior (e.g., permit, deny or drop), the source, the destination, the port(s), the protocol(s), etc. In addition, the user may also provide a name for the rule, select an ownership group for the rule, etc. As can be seen, such an interface is very intuitive and allows a user to easily and understandably create rules. FIGS. 9 and 10 are examples of screen shots confirming and summarizing the creation of a new rule.

According to various embodiments, the present invention could be used, for example, to prevent test trade orders, used at a trading firm to test how order flow will be handled by new software, from reaching a trading exchange. The gateway 10 in such a case may be loaded with rules to recognize that trade orders from certain hosts (such as hosts associated with business units that do not submit real trade orders) are not real trade orders and should be prevented from reaching the trading exchange. Embodiments of the present invention could also be used for other types of network activity, including network activity between two hosts associated with or within the same firm or entity.

As used herein, an "engine" may be considered a computer device or other piece of programmed hardware that is programmed to perform the described function(s). A processor or processors of the hardware may execute software code stored as a series of instructions or commands on a computer readable medium in order to perform the described function(s).

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments.

It is to be understood that the figures and descriptions of the embodiments have been simplified to illustrate elements that are relevant for a clear understanding of the embodiments, while eliminating, for purposes of clarity, other elements. For example, certain operating system details and modules of network platforms are not described herein. Those of ordinary skill in the art will recognize, however, that these and other elements may be desirable in a typical processor or computer system. However, because such elements are well known in the art and because they do not facilitate a better understanding of the embodiments, a discussion of such elements is not provided herein.

In general, it will be apparent to one of ordinary skill in the art that at least some of the embodiments described herein may be implemented in many different embodiments of software, firmware and/or hardware. The software and firmware code may be executed by a processor or any other similar computing device. The software code or specialized control hardware which may be used to implement embodiments is not limiting. For example, embodiments described herein may be implemented in computer software using any suitable computer software language type such as, for example, C or C++ using, for example, conventional or object-oriented techniques. Such software may be stored on any type of suitable computer-readable medium or media such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (non-volatile) memory, an optical disk, magnetic tape, or magnetic disk. Furthermore, at least some of the processes may be programmed when the computer system is manufactured or stored on various types of computer-readable media. Such media may include any of the forms listed above with respect to storage devices and/or, for example, a modulated carrier wave, or otherwise manipulated, to convey instructions that may be read, demodulated/decoded, or executed by a computer or computer system.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semi-permanent and/or semi-temporary. A computer-readable medium may further include one or more data signals transmitted on one or more carrier waves.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component, to perform a given function or functions. Except where such substitution would not be operative, such substitution is within the intended scope of the embodiments. Any servers described herein, for example, may be replaced by a "server farm" or other grouping of networked servers that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations and adaptations to those embodiments may occur to persons skilled in the art with attainment of at least some of the advantages. The disclosed embodiments are therefore intended to include all such modifications, alterations and adaptations without departing from the scope of the embodiments as set forth herein.

What is claimed is:

1. A computer-implemented method for establishing rules for communication with a first host, the method comprising:
   collecting, by a computer system, network activity data for communications between the first host and a second host;
   analyzing, by the computer system, the network activity data;
   creating, by the computer system, rule data for rules governing communications between the first and second hosts based on the analysis;
   downloading, by the computer system, to a gateway for the first host, the rule data, wherein the rule data enables the gateway to prevent communications between the first host and the second host when the communications violate the rule data;
   loading, by the computer system, the rule data to a first database;
   analyzing, by the computer system, a trend in rule growth for the rules stored in the first database to determine when the rule data should be downloaded to the gateway; and
   replicating, by the computer system, the rule data from the first database to a second database based on the analysis of the trend in rule growth, wherein the rule data is downloaded to the gateway from the second database.

2. The method of claim 1, wherein replicating the rule data to the second database is performed, by the computer system, when the analysis of the trend in rule growth determines that the gateway is ready for enablement.

3. The method of claim 2, further comprising, after enabling the gateway:
   updating, by the computer system, the rules in the first database; and
   replicating, by the computer system, the updated rules to the second database.

4. The method of claim 3, wherein updating the rules in the first database comprises at least one of:
   updating the rules in the first database regarding a change to a network to which the first host belong; and
   updating the rules in the first database based on rule updates provided by a user.

5. The method of claim 4, wherein updating the rules based on rule updates provided by the user comprises creating a new rule.

6. The method of claim 3, wherein:
   the first database comprises a read-writable database; and
   the second database comprises a read-only database.

7. The method of claim 1, wherein the rule data prevents test trade orders from being sent from the first host to the second host.

8. The method of claim 1, further comprising denying, by the gateway, a communication to the first host that does not match a rule in the rule data that permits the communication to the first host.

9. The method of claim 1, further comprising denying, by the gateway, a communication from the first host that does not match a rule in the rule data that permits the communication from the first host.

10. A system for establishing rules for communication with a first host, the system comprising:
- a computer system comprising at least one computer, wherein the computer system comprises a rules engine and an activity analyzer engine,
- wherein the rules engine is for collecting network activity data for communications between the first host and a second host and creating rules for governing communications between the first and second hosts;
- a first database for storing the rules;
- wherein the activity analyzer engine for analyzing a trend in rule growth for the rules stored in the first database;
- a second database associated with the first host for storing a replication of the rules; and
- a gateway in communication with the first host for preventing, based on the rules, a communication between the first host and the second host which violates one or more of the rules, wherein the rules are downloaded from the second database to the gateway based on the analysis by the activity analyzer engine.

11. The system of claim 10, wherein the computer system further comprises a data synchronization engine for updating the first database with updates for entities.

12. The system of claim 11, wherein the updates comprise updates on clusters, location, networks, or ports.

13. The system of claim 10, wherein:
the first database comprises a read-writable database; and
the second database comprises a read-only database.

* * * * *